United States Patent
Kim et al.

[11] Patent Number: 5,986,971
[45] Date of Patent: Nov. 16, 1999

[54] IMAGE PROCESSING SYSTEM AND METHOD FOR ESTIMATING ACOUSTIC PROPERTY OF A MOVABLE SOUND SOURCE

[75] Inventors: Yang-hnn Kim; Hew Sang Kwon, both of Taejun, Rep. of Korea

[73] Assignee: Korea Advanced Institute Science and Technology, Rep. of Korea

[21] Appl. No.: 08/976,356

[22] Filed: Nov. 21, 1997

[30] Foreign Application Priority Data

Nov. 22, 1996 [KR] Rep. of Korea .................. 96-56842

[51] Int. Cl.⁶ .................................................. G03H 3/00
[52] U.S. Cl. .................................................. 367/8
[58] Field of Search .................. 367/8; 73/603; 706/22, 911

[56] References Cited

U.S. PATENT DOCUMENTS 4,415,996  11/1983  Maynard et al. ........................ 367/8

OTHER PUBLICATIONS

Hald, "STSF — a unique technique for scan–based Near–field Acoustic Holography without restrictions on coherence," Technical Review No. 1, 1989.

Loyau et al., "Broadband acoustic holography reconstruction from acoustic intensity measurements. I: Principle of the method," J. Acoust. Soc. Am.:84(5), Nov. 1988, pp. 1744–1750.

Maynard et al., "Nearfield acoustic holography: I. Theory of generalized holography and the development of NAH," J. Acoust. Soc. Am.:78 (4), Oct. 1985, pp. 1395–1413.

Veronesi and Maynard, "Nearfield acoustic holography (NAH) II. Holographic reconstruction algorithms and computer implementation," J. Acoust. Soc. Am.: 8(5), May 1987, pp. 1307–1322.

Primary Examiner—Daniel T. Pihulic
Attorney, Agent, or Firm—Fish & Richardson P.C.

[57] ABSTRACT

An image processing system for estimating acoustic properties emitted from a movable sound source on a point in the sound field thereof comprises photoelectric sensors 11 and 12 for measuring a velocity and a moving direction of the sound source; a microphone array 13 for detecting an acoustic energy from the sound source on a detection surface at plural points having an interval smaller than one half of the wave length of the acoustic property, the microphone array 13 moved in a direction perpendicular to the detection surface; a multiplexer 14 for multiplexing signals inputted from the photoelectric sensors 11 and 12 and the microphone array 13 through a single output line, wherein the signals represent a value of the acoustic energy, a velocity and a moving direction of the sound source, and a velocity and a moving direction of the microphone array 13, respectively; and a personal computer 15 for setting relative coordinate systems comprising a hologram coordinate system and a detective coordinate system, in which the hologram coordinate system is moved in the velocity and the direction same with those of the sound source, and the relative coordinate system is moved in the velocity and the direction same with those of the microphone array 13, and in which in order to estimate a value of the acoustic property on a point in the sound field, the personal computer 15 carries out Fourier transform of data relating to the microphone array 13 in the detective coordinate system by a time factor.

8 Claims, 7 Drawing Sheets

5,986,971

IMAGE PROCESSING SYSTEM AND METHOD FOR ESTIMATING ACOUSTIC PROPERTY OF A MOVABLE SOUND SOURCE

TECHNICAL FIELD

This invention relates to an image processing system for estimating acoustic property of a sound source using a hologram in a surface to show a position and radiation properties of the sound source, more particularly, to the image processing system to be able to detect and disclose a position and radiation properties of a static or movable sound source by only a few microphones. This invention also relates to an image processing method for estimating acoustic property of a sound source by the image processing system.

BACKGROUND ART

Holography that obtains an information concerning to a sound source from a hologram of sound pressure emitted from the sound source and measured on a reference surface in the sound field of the sound source. It has been broadly uesed in civilian and munition industries. Informations to be obtained from the hologram may comprise a farfield directivity information, a nearfield vector intensity information, a surface velocity information, a total sound power information and so forth.

More particularly, the holography may be applied in an apparatus for finding out the enemy's soldiers in the munition industry. In a civilian industry, for example, it is applied to detect a sound source and then to eliminate the sound source or to build a soundproofing wall. Nowadays, growing demand to life environmental protection results in increasing a need for appropriately coping with any bothersome noise.

Studies of holography which are remarkably related to this invention are as follows: "Nearfield acoustic holography (NAH)-1. Theory of generalized holography and the development of NAH by J. D. Maynard, E. G. Williams and Y. Lee, disclosed in Journal of the Acoustical Society of America, Vol. 74, No. 4, pp1395–1413; "Nearfield acoustic holography (NAH)-2". Holographic reconstruction algorithms and computer implementation" by W. A. Veronesi and J. D. Maynard, disclosed in Journal of the Acoustical Society of America, Vol. 81, No. 5, pp1307–1322; U.S. Pat. No. 4,415,996 entitled "Nonwavelength-limited holographic sound field reconstruction" by J. D. Maynard and E. G. Williams; "Method of Spatial Transformation of Sound Fields—a unique technique for scan-based near-field acoustic holography without restrictions on coherence" by J. Hald, disclosed in Technical Review No 1, 1989, B&K publication; and "Broadband acoustic holography reconstruction from acoustic intensity measurement" by Loyau, J. C. Pascal and P. Gaillard, disclosed in Journal of the Acoustical Society of America, Vol. 84, No. 5, pp1744–1750.

In holography, a hologram is obtained on a reference surface that is so called "a hologram surface" and then the hologram is analized to estimate an acoustic property on any point in the environmental space. The hologram surface may be a plane or a cylindrical surface. In shape of the hologram surface, it is discriminated into a planar acoustic holography, a cylindrical acoustic holography and spherical acoustic holography.

In the planar acoustic holography, it is needed theoretically to measure sound pressure on an infite number of points in order to obtain a hologram showing distribution of the sound pressure on an infinitely great plane. In practice, however, a hologram is obtained by measuring sound pressure on a limited number of points considering time and cost taken in measurement.

Accuracy of the hologram is affected by density of measuring points, i.e., distance between adjacent measuring points. Accuracy of the hologram is inversely proportionated to the distance. Low accuracy of the hologram results in deteriorating accuracy of an estimated sound pressure in the sound field. Therefore, it is needed to provide technics for obtaining a highly accurate hologram while decreasing time and cost taken in measurement.

In U.S. Pat. No. 4,415,996 by W. A. Veronesi and J. D. Maynard, based on the thesis of "Nearfield acoustic holography (NAH)-2. Holographic reconstruction algorithms and computer implementation" disclosed in Journal of the Acoustical Society of America, Vol. 81, No. 5, pp1307–1322, "Nonwavelength-limited holographic sound field reconstruction" is described, in which a hologram is obtained by a microphone array comprising microphones on matrix positions of 16 rows by 16 lines. In this method, very highly cost has to be taken, because of the number of microphones up to 256.

In the thesises of "Method of Spatial Transformation of Sound Fields—a unique technique for scan-based near-field acoustic holography without restrictions on coherence" by J. Hald, disclosed in Technical Review No 1, 1989, B&K publication, and "Broadband acoustic holography reconstruction from acoustic intensity measurement" by Loyau, J. C. Pascal and P. Gaillard, disclosed in Journal of the Acoustical Society of America, Vol. 84, No. 5, pp1744–1750, there are described methods for measuring sound pressure in turn on plural points by a set of microphones fewer than the number of measurement positions. One of problems in these methods is that in order to measure sound pressure on each measurement position, a microphone has to be stayed on the position for a given time.

Aforementioned measuring methods have a basic limitation that accurate measurement of sound pressure is able to only the time when a microphone is stayed on a measurement position since there is no consideration about any relative motion between the microphone and the sound source. That is, it is not able to measure for a movable sound source. In measurement for a static sound source, scanning method in which sound pressure is measured during movement of the microphone.

SUMMARY OF INVENTION

Therefore, one of objectives of this invention is that provides technics for measuring sound pressure with a microphone moved on a hologram surface so that very accurate hologram can be obtained for a shot time using fewer microphones with no relation to movability of a sound source.

According to the invention for achieving the objectives, there is provided an image processing system for estimating acoustic properties emitted from a movable sound source on a point in the sound field thereof, the sound source radiating an acoustic energy into the enviromental space, in which a value of an acoustic property is estimated by a hologram of the acoustic property in a hologram surface keeping pace with the sound source. The image processing system comprises means for measuring a velocity and a moving direction of the sound source. The image processing system also comprises means for detecting an acoustic energy from the sound source on a detection surface at plural points having an interval smaller than one half of the wave length $\lambda$ of the acoustic property. The detecting means is moved in a direction perpendicular to the detection surface. The image processing system comprises means for multiplexing signals inputted from the measuring means and the detecting means through a single output line. The signals represent a value of the acoustic energy, a velocity and a moving direction of the sound source, and a velocity and a moving direction of the detecting means, respectively. Moreover, the image processing system comprises an operator for setting relative coordinate systems comprising a hologram coordinate system and a detective coordinate system. The hologram coordinate system is moved in the velocity and the direction same with those of the sound source, and the relative coordinate system is moved in the velocity and the direction same with those of the detecting means. In order to estimate a value of the acoustic property on a point in the sound field, the operator carries out Fourier transform of data relating to the detecting means in the detective coordinate system by a time factor using Equation 7 as follows:

$$F_T\{p_{hol}(ut, y, z_H; t)\} = \frac{1}{2u}\left\{\sum_{i=1}^{l}\hat{P}_{hol}\left(\frac{2\pi(f_i - f)}{u}, y, z_H; f_i\right) + \sum_{i=1}^{l}\hat{P}_{hol}^*\left(\frac{2\pi(f_i + f)}{u}, y, z_H; f_i\right)\right\}$$

Equation 7 in which $F_T$ represents a Fourier transform function, $p_{hol}$ represents a value of an acoustic property including a time factor in the detective coordinate system, u represents a relative velocity of the detective coordinate system to the hologram coordinate system, $z_H$ represents a Z-axis coordinate of the hologram surface in the hologram coordinate system, t represents a time, $\hat{P}_{hol}$ represents a value of acoustic property including a frequency factor by a number of waves measured in the hologram coordinate system, $\hat{P}_{hol}^*$ represents a conjugate complex number of $\hat{P}_{hol}$, f represents a frequency factor, and $f_i$ represents an individual frequency factor for each hologram.

In the image processing system for estimating sound pressure emitted from a movable sound source on a point in the sound field thereof, the measuring means may comprise at least two photoelectric sensors. The detecting means may comprise a microphone array for detecting a sound pressure from the sound source and for generating an electric signal corresponding to the sound pressure. The multiplexing means may comprise mulitiplexer for outputting plural signals through only a single line, in which the outputted signals include signals relating to a velocity and a moving direction of the microphone array and the sound source and an electric signal emitted from the microphone array. Furthermore, the operator may comprise a personal computer for estimating a value of the sound pressure on a point in the sound field using a value of the sound pressure detected by the microphone array. Preferably, the microphone array has sixteen microphones disposed in an interval along with a line perpendicular to the moving direction of the microphone array. In operation, the personal computer setes relative coordinate systems comprising a hologram coordinate system and a detective coordinate system, in which the hologram coordinate system is moved in the velocity and the direction same with those of the sound source, and the relative coordinate system is moved in the velocity and the direction same with those of the microphone array. The personal computer also carries out Fourier transform of data relating to the microphone array in the detective coordinate system by a time factor using Equation 7 as abovementioned.

According to the invention, there is also provided an image processing method for estimating acoustic properties emitted from a movable sound source on a point in the sound field thereof, the sound source radiating an acoustic energy into the enviromental space, in which a value of an acoustic property is estimated by a hologram of the acoustic property in a hologram surface keeping pace with the sound source. The image processing method comprise steps for inputting initial data to an operator, in which the initial data comprises data of initial positions of the sound source and a detecting means; for setting relative coordinate systems comprising a hologram coordinate system having the orign disposed on the initial position of the sound source and a detective coordinate system; and for estimating a value of the acoustic property on a point in the sound field by carrying out Fourier transform of data relating to the detecting means in the detective coordinate system by a time factor using Equation 7 as abovementioned.

In the image processing method for estimating sound pressure emitted from a movable sound source on a point in the sound field thereof, the detecting means may comprise a microphone array. In this method, the initial data inputted in the inputting step may comprise data of the initial position of the sound source detected by photoelectric sensors and data of an initial position of the microphone array. The setting step and the estimating step may be carried out by a personal computer.

BRIEF DESCRIPTION OF DRAWINGS

Features and Advantages of this invention will be apparent to a person who has read following description with reffering to attached drawings. In the drawings.

DETAILED DESCRIPTION OF PREFERRED EMBODIMENTS

Figure 1:
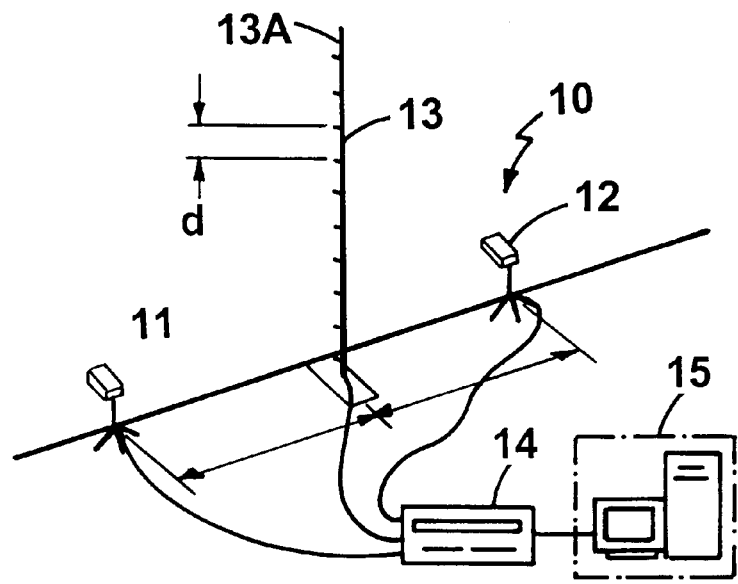
FIG. 1 shows a schematic diagram of an image processing system used for a movable sound source according to an embodiment of this invention.

Hereinafter, an embodiment of an image processing system used for a movable sound source according to an embodiment of this invention will be specifically described referring to the drawings.

The image processing system 10 showed FIG. 1 can be used in image processing to estimate sound pressure emitted from a movable sound source on a point in the sound field thereof. A value of the sound pressure is estimated by a hologram of the sound pressure in a hologram surface 22 keeping pace with the sound source.

The image processing system 10 according to this embodiment comprises at least two photoelectric sensors 11 and 12 as means for measuring speed and direction of the sound source. The image processing system 10 also comprises a microphone array 13 for receiving sound pressure from the sound source and for generating an electric signal corresponding to the sound pressure. A mulitiplexer 14 is provided to output plural signals through only a single line. The signals include signals relating to a velocity and a moving direction of the microphone array 13, signals relating to a velocity and a moving direction of the sound source, and an electric signal emitted from the microphone array 13. A personal computer 15 is used as a operator for estimating a value of the sound pressure on a point in the sound field using a value of the sound pressure received by the microphone array.

In this embodiment, the microphone array 13 has sixteen microphones 13A disposed in an interval "d" along with a line perpendicular to the moving direction of the microphone array 13.

Figure 2:
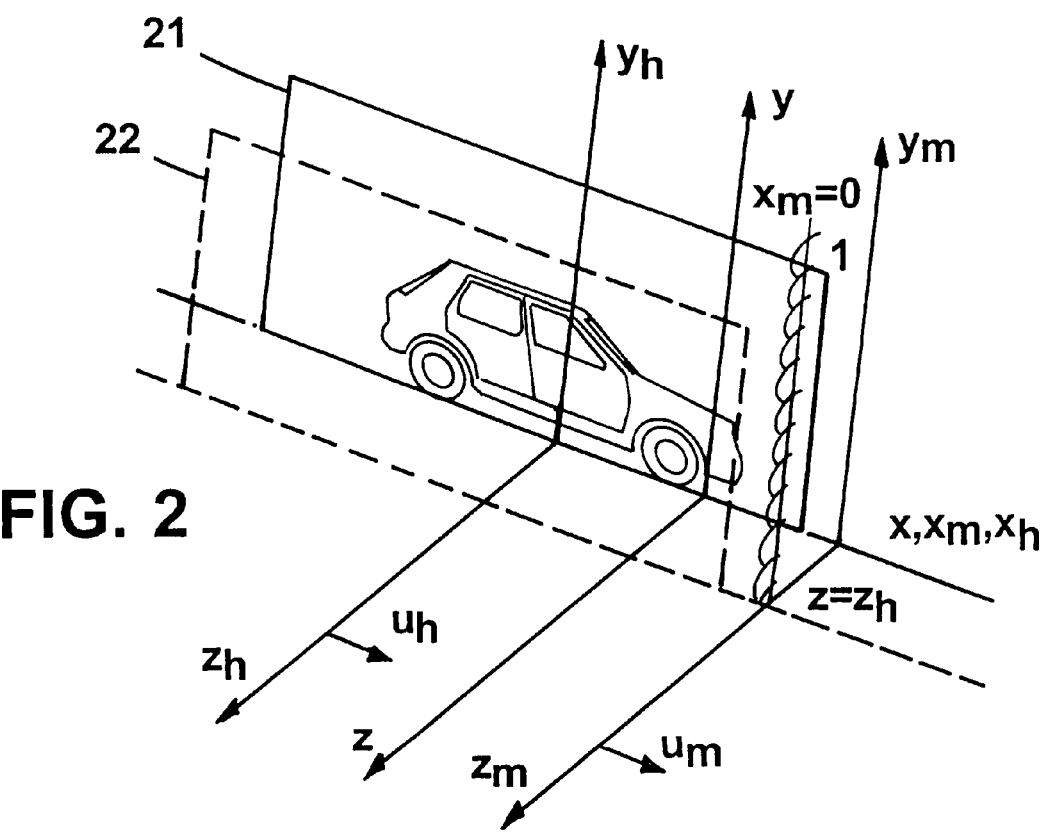
FIG. 2 shows an absolute coordinate system and relative coordinate systems set upon estimating an acoustic property of an sound source mounted on a moving car by the image processing system showed in FIG. 1.

As showed in FIG. 2, the personal computer 15 is controlled to set relative coordinate systems comprising a hologram coordinate system $C_{hol}$ and a detective coordinate system $C_{mic}$, in which the hologram coordinate system $C_{hol}$ is moved in the velocity and the direction same with those of the sound source, and the relative coordinate system $C_{mic}$ is moved in the velocity and the direction same with those of the microphone array 13. The personal computer 15 also carries out Fourier transform of data relating to the microphone array 13 in the detective coordinate system $C_{mic}$ by a time factor using Equation 7 as follows.

$$F_T\{p_{hol}(ut, y, z_H; t)\} = \frac{1}{2u}\left\{\sum_{i=1}^{l} \hat{P}_{hol}\left(\frac{2\pi(f_i - f)}{u}, y, z_H; f_i\right) + \sum_{i=1}^{l} \hat{P}_{hol}^*\left(\frac{2\pi(f_i + f)}{u}, y, z_H; f_i\right)\right\}$$

Equation 7 in which $F_T$ represents a Fourier transform function, $p_{hol}$ represents a value of an sound pressure including a time factor in the detective coordinate system $C_{mic}$, u represents a relative velocity of the detective coordinate system $C_{mic}$ to the hologram coordinate system $C_{hol}$, $z_H$ represents a Z-axis coordinate of the hologram surface 22 in the hologram coordinate system $C_{hol}$, t represents a time, $\hat{P}_{hol}$ represents a value of sound pressure including a frequency factor by a number of waves measured in the hologram coordinate system $C_{hol}$, $\hat{P}_{hol}^*$ represents a conjugate complex number of $\hat{P}_{hol}$, f represents a frequency factor, and $f_i$ represents an individual frequency factor for each hologram.

Figure 3:
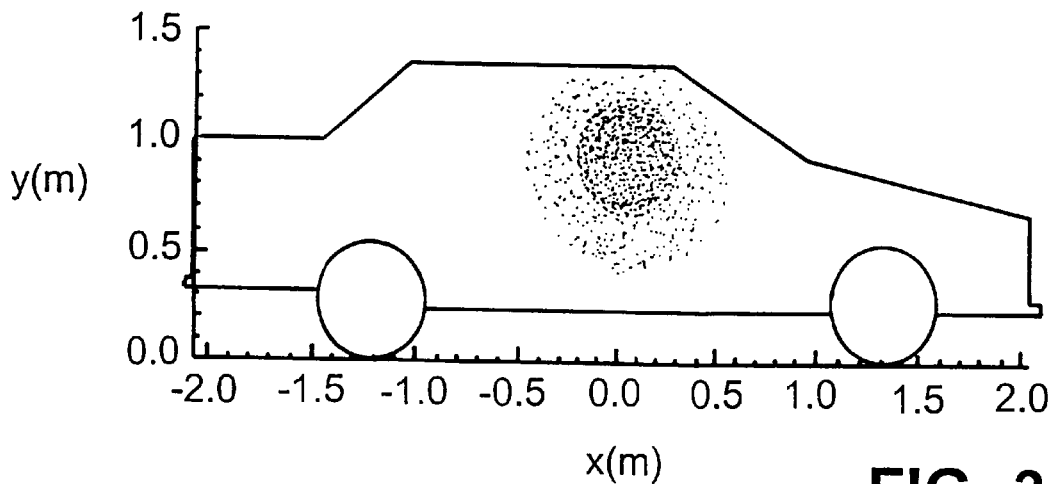
FIG. 3 shows distribution of sound pressure at a side of the car estimated by the image processing system showed in FIG. 1.
Figure 4:
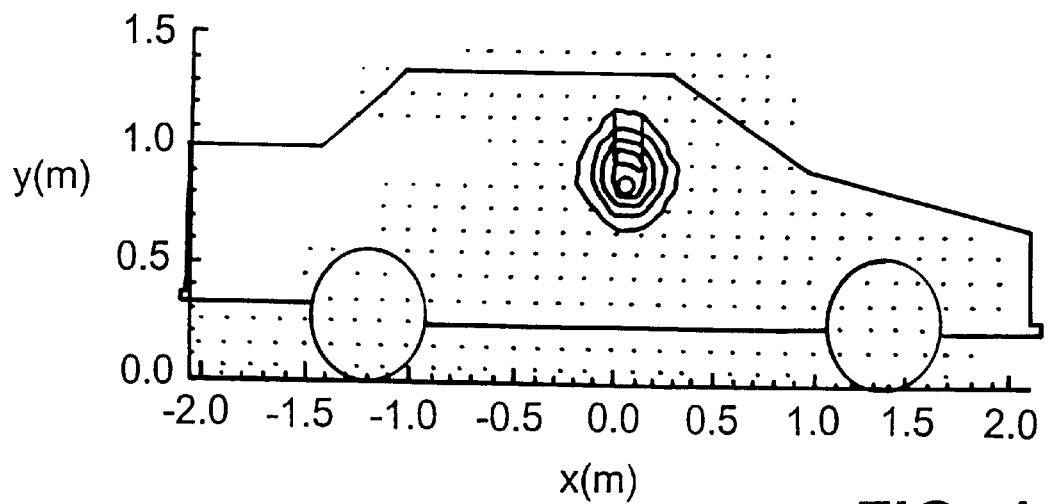
FIG. 4 shows distribution of acoustic intencity at a side of the car estimated by the image processing system showed in FIG. 1.

Examples of hologram of acoustic intencity, e.g., sound pressure estimated by the personal computer 15 are showed in FIGS. 3 and 4. FIGS. 3 and 4 show sound pressure and acoustic intencity estimated at a side of the car. The hologram can be displayed by a displayer, e.g., a monitor or a printer connected to the personal computer 15. In this embodiment, a 32 channel signal analyzer.

Now, it will be described how an estimated sound pressure $p_{hol}$ in the hologram coordinate system $C_{hol}$ is Fourier-transformed from a measured sound pressure $p_{mic}$ in the detective coordinate system $C_{mic}$. In the relative coordinate systems and the absolute coordinate system set by the personal computer 15, sound pressure can be represented as follows.

(A) Sound pressure in the absolute coordinate system; p(x, y, z; t)
(B) Sound pressure in the detective coordinate system; $p_{mic}(x_m, y_m, z_m; t)$
(C) Sound pressure in the hologram coordinate system; $p_{hol}(x_h, y_h, z_h; t)$ In assumption of that at the time of t=0, all of the coordinate systems have a same position and attitude with each other, and that between the coordinate systems, only a relative motion along X-axis direction is existed, and Y-coordinates and Z-coordinates in all of the coordinate systems correspond with each other. That is, there are relations of $y=y_m=y_h$ and $z=z_m=z_h$. Sound pressure measured by the microphone array 13 disposed at the position of $x_m=0$ in the hologram surface ($z=z_H$) can be represented by Equation 1.

Equation 1

$$p_{mic}(0, y, z_H; t) = p_{hol}(ut, y, z_H; t)$$

in which u means a relative speed of the detective coordinate system $C_{mic}$ to the hologram coordinate system $C_{hol}$.

A coordinate of the sound pressure measured by the microphone array 13 is transformed to a coordinate in the hologram coordinate system $C_{hol}$ and in turn the transformed coordinate is used to estimate sound pressure in the sound field.

A hologram that means a map of distribution with frequency in a space can be obtained by Fourier-transforming a sound pressure signal in each measurement point with time. Therefore, Equation 2 and Equation 3 can be obtained.

$$P_{hol}(x_h, y_h, z_H; f) = F_T\{p_{hol}(x_h, y_h, z_H; t)\}$$

Equation 2

$$= \int_{-\infty}^{\infty} p_{hol}(x_h, y_h, z_H; t)e^{j2\pi ft} dt$$

$$p_{hol}(x_h, y_h, z_H; t) = F_T^{-1}\{P_{hol}(x_h, y_h, z_H; f)\}$$

Equation 3

$$= \int_{-\infty}^{\infty} \hat{P}_{hol}(x_h, y_h, z_H; f)e^{-j2\pi ft} df$$

For a sound pressure affected by the relative motion, a distance factor x includes a component of a time factor t. Therefore, a sound pressure for the hologram can not be directly calculated by Fourier transform with time using Equation 2 or Equation 3. For such a case, Equation 4 can be used.

$$F_T\{p_{hol}(ut, y, z_H; t)\} = \frac{1}{u}\int_{-\infty}^{\infty} \hat{P}_{ho}\left(\frac{2\pi(f_h - f)}{u}, y, z_H; f_h\right) df_h$$

Equation 4 in which the right term $$\hat{P}_{ho}\left(\frac{2\pi(f_h - f)}{u}, y, z_H; f_h\right)$$

means a spectrum of wave number which is obtained by Fourier transform of the hologram in three dimensions.

The spectrum of wave number has a relation with the hologram that meets Equation 5 and Equation 6.

$$\hat{P}_{hol}(k_x, y_h, z_H; f) = F_X\{P_{hol}(x_h, y_h, z_H; f)\}$$

Equation 5

$$= \int_{-\infty}^{\infty} P_{hol}(x_h, y_h, z_H; f)e^{-jk_x x_h} dx_h$$

-continued $$P_{hol}(x_h, y_h, z_H; f) = F_x^{-1}\{\hat{P}_{hol}(k_x, y_h, z_H; f)\} \quad \text{Equation 6}$$

$$= \frac{1}{2\pi} \int_{-\infty}^{\infty} \hat{P}_{hol}(k_x, y_h, z_H; f) e^{jk_x x_h} dk_x$$

In Fourier transform of the measured sound pressure signal, the spectrum of wave number for each frequency $f_h$ forms a zone around the associated frequency $f_h$. Therefore, a hologram for a frequency can be obtained by separating a spectrum of wave number for the associated frequency and then carrying out inverse Fourier transform of the spectrum.

For separating the spectrum exactly, spectrums for adjacent frequencies shall not be overlapped on each other. That is, the zone of the spectrum has to be narrower than an interval of adjacent frequencies. Therefore, it is noticed that acoustic signals emitted from the sound source shall not comprise any zoned frequency, but only independent component frequencies. A sound pressure signal measured in the sound field in which pure sound components by the number of / are emitted from the sound source can be Fourier transformed with Equation 7.

$$F_T\{p_{hol}(ut, y, z_H; t)\} = \frac{1}{2u}\left\{\sum_{i=1}^{l} \hat{P}_{hol}\left(\frac{2\pi(f_i - f)}{u}, y, z_H; f_i\right) + \sum_{i=1}^{l} \hat{P}_{hol}^*\left(\frac{2\pi(f_i + f)}{u}, y, z_H; f_i\right)\right\} \quad \text{Equation 7}$$

in which $F_T$ represents a Fourier transform function, $p_{hol}$ represents a value of an sound pressure including a time factor in the detective coordinate system, u represents a relative velocity of the detective coordinate system to the hologram coordinate system, $z_H$ represents a Z-axis coordinate of the hologram surface in the hologram coordinate system, t represents a time, $\hat{P}_{hol}$ represents a value of sound pressure including a frequency factor by a number of waves measured in the hologram coordinate system, $\hat{P}_{hol}^*$ represents a conjugate complex number of $\hat{P}_{hol}$, f represents a frequency factor, and $f_i$ represents an individual frequency factor for each hologram.

Figure 5:
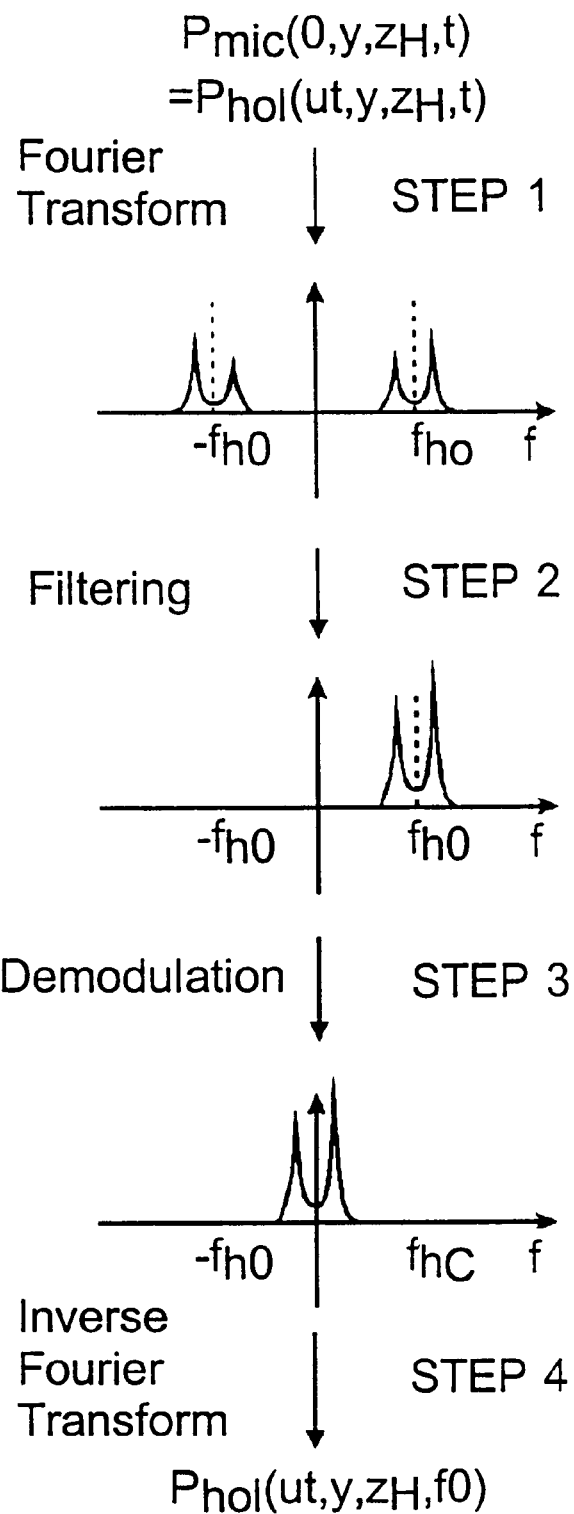
FIG. 5 shows several graphs for illustrating a series of steps for estimating an acoustic property

As showed in FIG. 5, a method for obtaining a hologram $P_{hol}(ut, y, z_H; f_0)$ comprises STEP 1 for measuring a sound pressure signal $p_{mic}(0, y, z_H; t) = p_{hol}(ut, y, z_H; t)$ for each frequency and for Fourier transforming the signal, STEP 2 for filtering the transformed signal, STEP 3 for demodulating the filtered signal, and STEP 4 for inverse Fourier transforming the demodulated signal. Relation between the frequency and the wave number meets Equation 8.

$$\frac{2\pi(f_i - f)}{u} = k_x \quad \text{Equation 8}$$

Using Equation 8, a condition for interval between adjacent frequencies against a given size of the zone of tne spectrum can be obtained.

Under the planar acoustic holography, interval between adjacent measurement points shall be smaller than on half of the wave length λ. In this embodiment, the interval was set to be quarter of the wave length λ. Firstly, the relative velocity u of the detective coordinate system to the hologram coordinate system was set to meet Equation 9 in which M means Mach number u/c.
Equation 9

M<0.5

Interval between adjacent frequencies is calculated with Equation 10.

$$f_{i+1} > \frac{1 + 2M}{1 - 2M} f_i \quad \text{Equation 10}$$

From Equation 10, $f_{i+1}$ is always larger than $f_i$ apparently. Since in general practice, the relative speed u is very smaller than the speed of sound c, the condition with Equation 10 can be easily met.

Figure 6:
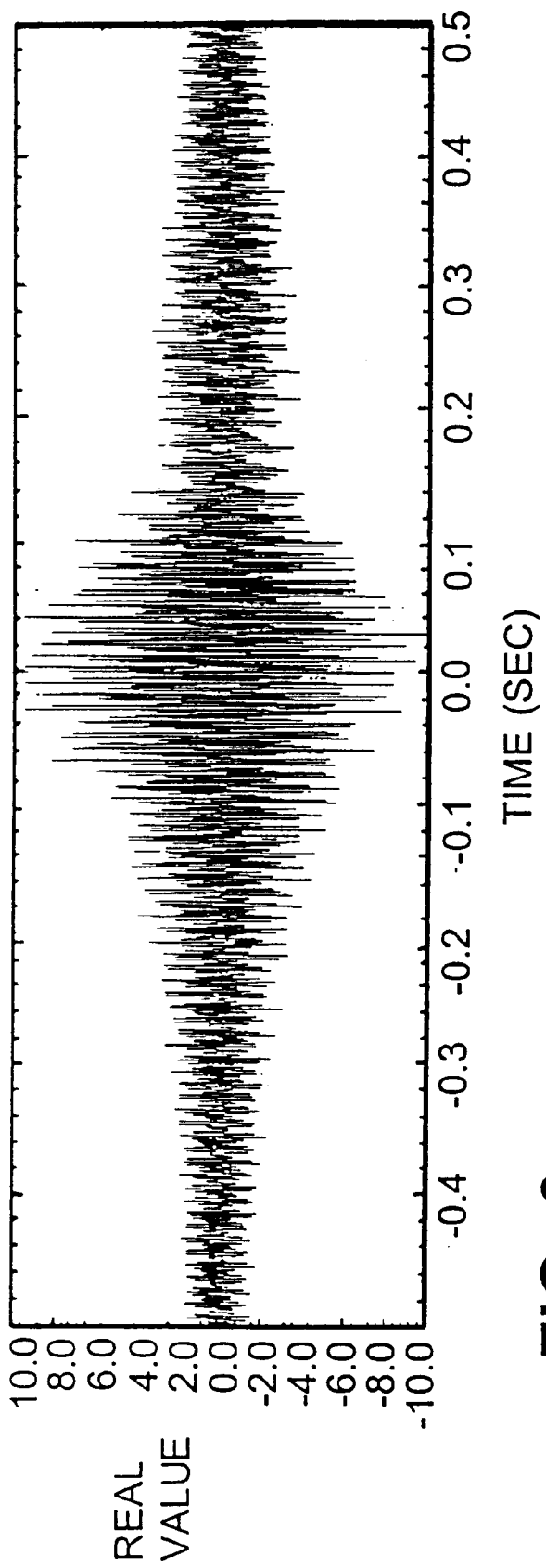
FIG. 6 shows a graph for illustrating intencity of sound pressure with time.
Figure 7:
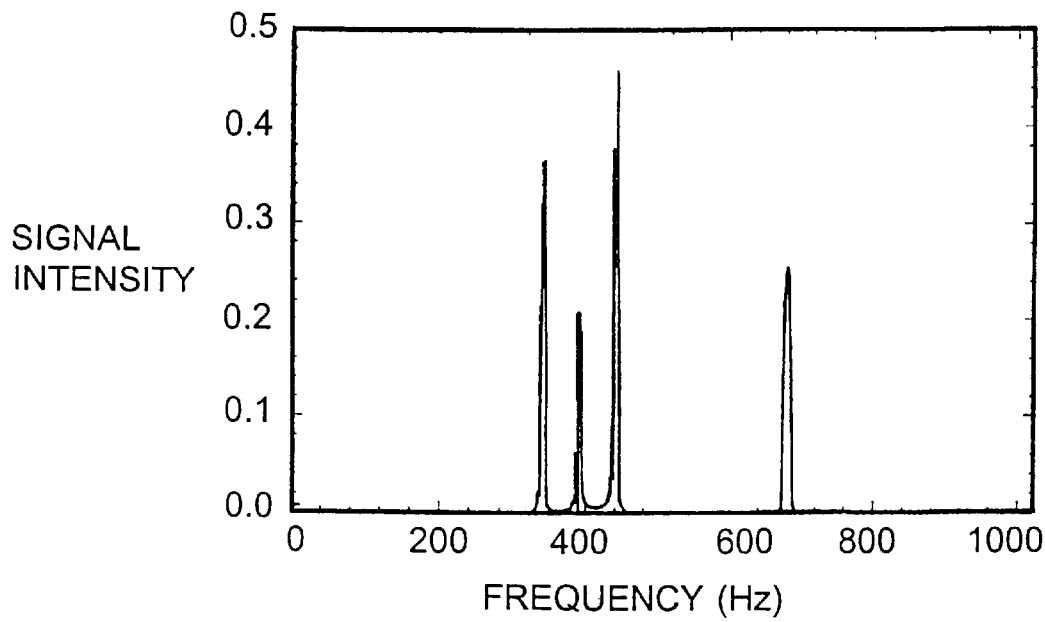
FIG. 7 shows a spectrum transformed from a signal of sound pressure in estimation by the image processing system showed in FIG. 1, and FIGS. 8a to 8d show spectrums of wave number with frequency.
Figure 8A:
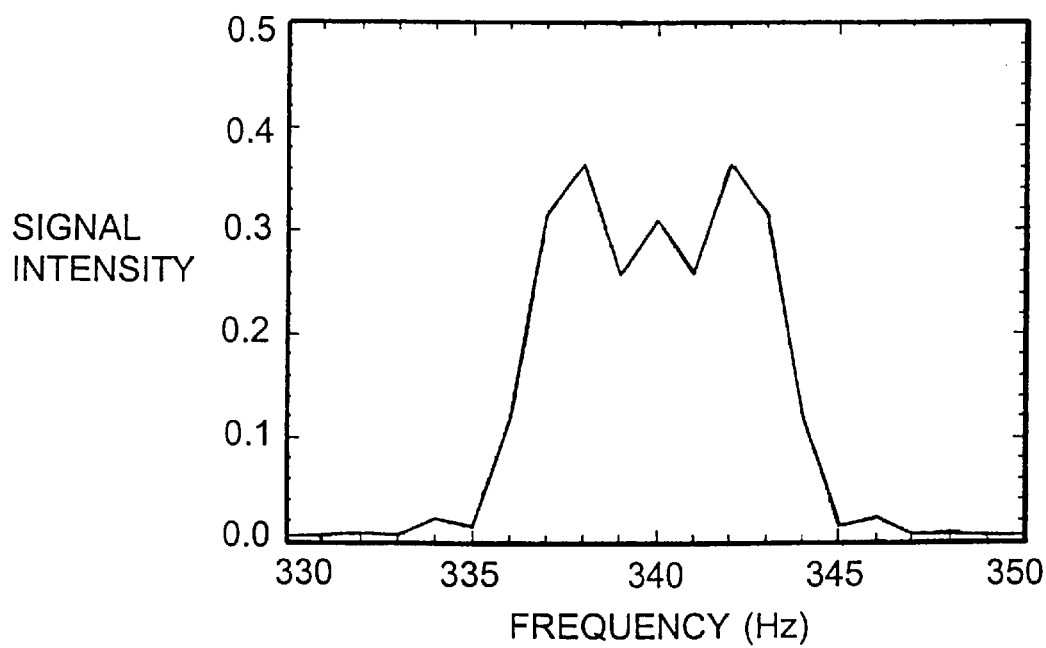
Figure 8B:
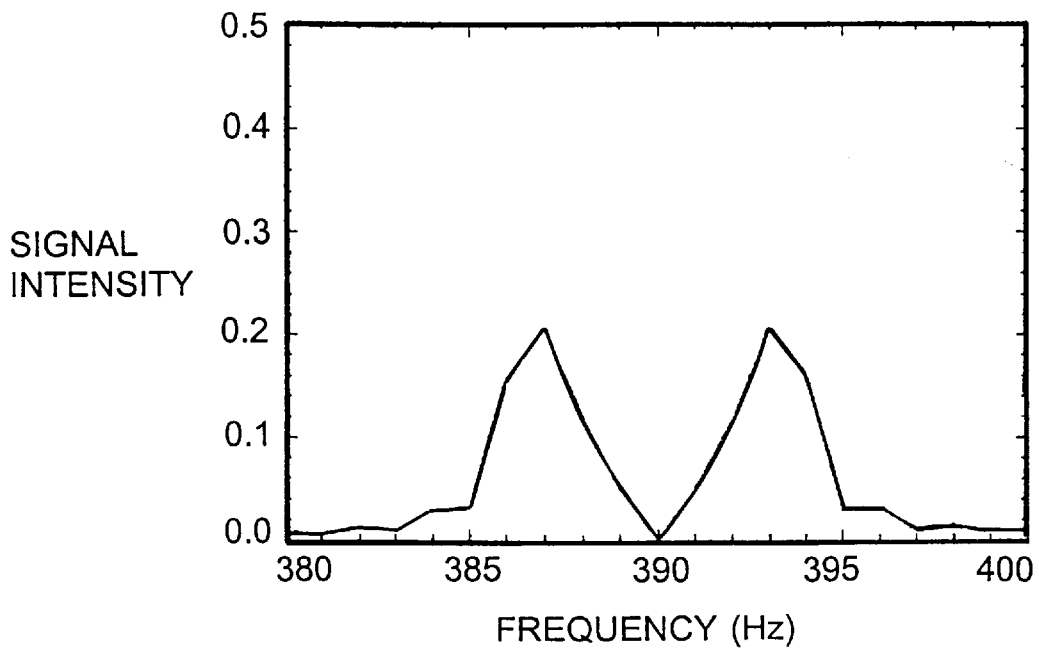
Figure 8C:
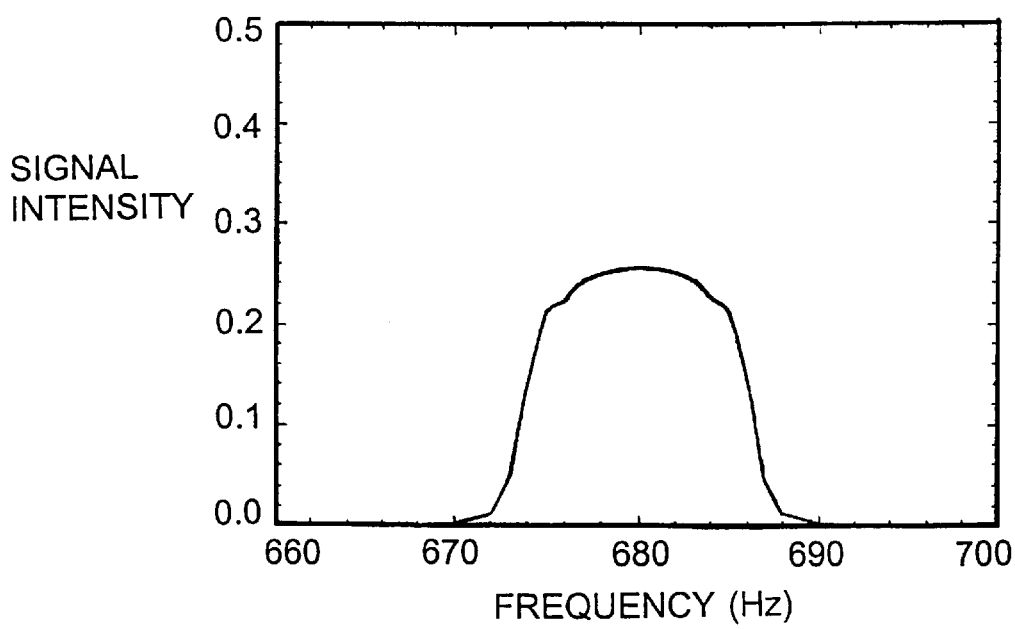
Figure 8D:
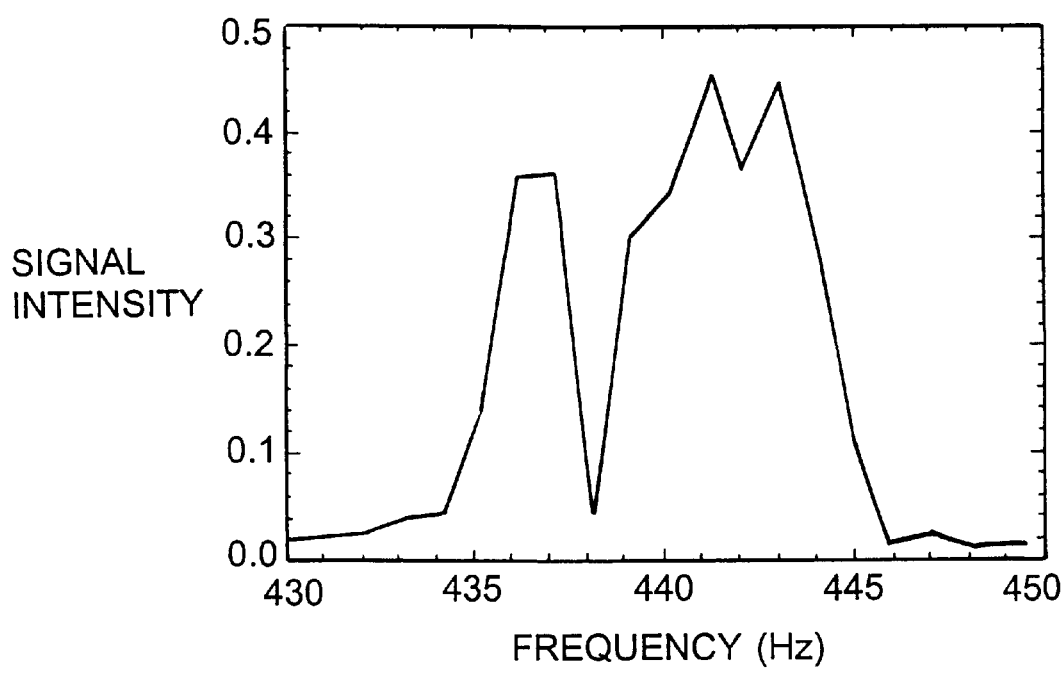

Referring to FIGS. 6, 7 and 8a to 8d, there is exemplified a test using the image processing system according to this embodiment and the method as above mentioned, in which estimation of sound pressure of a sound source by a computer under the condition of the relative speed u=3.4 m/sec (M=0.01) is simulated. In the test, a value of sound pressure is calculated by sound pressure signals measured at measuring points on a hologram surface 22 at the distance of 0.3 m from a sound source plane including four in-frequency sound sources combined from a single-polarity sound source and a double-polarity sound source. FIG. 6 shows a graph for illustrating intensity of sound pressure with time and FIG. 7 shows a spectrum transformed from a signal of sound pressure in estimation by the image processing system showed in FIG. 1. Furthermore, FIG. 8a shows spectrum of wave number around the frequency of 340 Hz, FIG. 8b shows spectrum of wave number around the frequency of 390 Hz, FIG. 8c shows spectrum of wave number around the frequency of 680 Hz and FIG. 8d shows spectrum of wave number around the frequency of 440 Hz. As showed in FIGS. 8a to 8d, each spectrum of wave number with frequency is represented to be a narrowed zone. Moreover, a inherent hologram of sound source will be seen from a consideration of the spectrums.

Now, there is exemplified a method for obtaining a hologram for a moving sound source using the image processing system according to this embodiment.

A speaker that is mounted on a front window of a car on moving in the speed of 8.024 m/sec (28.9 Km/sec) and emits a monotone sound of 700 Hz was used as a moving sound source. The microphone array 13 was arranged in a plane spaced from a side of the car by the distance of 62 cm. After obtaining a hologram from sound pressure signals measured by the microphone array 13, a value of sound pressure in the sound field was calculated using the measured sound pressure signals. A linear microphone array used for the microphone array 13 of the measuring means 10 had sixteen microphones comprising a first lowest microphone disposed at the height of 5 cm and other fifteen microphones spaced from each next microphone by the height of 10 cm. The photoelectric sensors 11 and 12 were disposed respectively at the right and the left of the microphone array 13 and spaced from the microphone array 13 by the distance of 3 m in the direction of X-axis. For the multiplexer 14, a 32-channel signal analyzer was used. In FIGS. 3 and 4, the acoustic property measured by the system and the method for image processing, that is, sound pressure and acoustic intensity are showed respectively. As seen from FIGS. 3 and 4, the hologram obtained by the image processing system according to this embodiment includes useful information relating to acoustic properties, i.e., sound pressure or acoustic intensity.

The aforementioned embodiment was described only for exemplifying not for limiting this invention. To a person skilled in this technical field, it may be apparent that any alteration, modification or change from the above preferred embodiment can be carried out without departing from the inventive idea. Although the method for obtaining a planar hologram in the above embodiment, this invention is not limited to the case of the planar hologram. Using a cylindrical microphone array on moving linearly in relation to the sound source, a cylindrical hologram may be obtained.

Therefore, this invention has to be fully protected within the attached claims that aim to include any change, alteration or modification without departing from the inventive idea.

We claim:

1. An image processing system for estimating acoustic properties emitted from a movable sound source on a point in the sound field thereof, the sound source radiating an acoustic energy into the environmental space, in which a value of an acoustic property is estimated by a hologram of the acoustic property in a hologram surface keeping pace with the sound source, comprising.

means for measuring a velocity and a moving direction of the sound source;

means for detecting acoustic energy from the sound source on a detection surface at a plurality of points having an interval smaller than one half of the wave length of the acoustic property, said detecting means moved in a direction perpendicular to the detection surface;

means for multiplexing signals inputted from said measuring means and said detecting means through a single output line, wherein the signals represent a value of the acoustic energy, a velocity and a moving direction of the sound source, and a velocity and a moving direction of said detecting means, respectively; and an operator for setting relative coordinate systems comprising a hologram coordinate system and a detective coordinate system, in which the hologram coordinate system is situated in the same velocity and direction coordinates with those of the sound source, and the relative coordinate system is situated in the same velocity and direction coordinates with those of said detecting means, and in which in order to estimate a value of the acoustic property on a point in the sound field, said operator carries out a Fourier transform of data relating to said detecting means in the detective coordinate system by a time factor as follows:

$$F_T\{p_{hol}(ut, y, z_H; t)\} = \frac{1}{2u}\left\{\sum_{i=1}^{I}\hat{P}_{hol}\left(\frac{2\pi(f_i - f)}{u}, y, z_H; f_i\right) + \sum_{i=1}^{I}\hat{P}_{hol}^*\left(\frac{2\pi(f_i + f)}{u}, y, z_H; f_i\right)\right\}$$ [Equation 7]

in which $F_T$ represents a Fourier transform function, $P_{hol}$ represents a value of an acoustic property including a time factor in the detective coordinate system, U represents a relative velocity of the detective coordinate system to the hologram coordinate system, $Z_H$ represents a Z-axis coordinate of the hologram surface in the hologram coordinate system, t represents a time, $\hat{P}_{hol}$ represents a value of acoustic property including a frequency factor by a number of waves measured in the hologram coordinate system, $\hat{P}_{hol}^*$ represents a conjugate complex number of $\hat{P}_{hol}$, f represents a frequency factor, and $f_i$ represents an individual frequency factor for each hologram.

2. An image processing system according to claim 1, for estimating sound pressure emitted from a movable sound source on a point in the sound field thereof, wherein said measuring means includes at least two photoelectric sensors;

said detecting means includes a microphone array for detecting a sound pressure from the sound source and for generating an electric signal corresponding to the sound pressure;

said multiplexing means comprises a multiplexer for outputting through only a single line plural signals including signals relating to a velocity and a moving direction of said microphone array and the sound source and an electric signal emitted from said microphone array;

said operator comprises a personal computer for estimating a value of the sound pressure on a point in the sound field using a value of the sound pressure detected by said microphone array;

said microphone array having sixteen microphones disposed in an interval along with a line perpendicular to the moving direction of said microphone array; and said personal computer setting relative coordinate systems comprising a hologram coordinate system and a detective coordinate system, in which the hologram coordinate system is situated in the same velocity and direction coordinates with those of the sound source, and the relative coordinate system is situated in the same velocity and direction coordinates with those of said microphone array, and said personal computer carrying out Fourier transform of data relating to said microphone array in the detective coordinate system by a time factor as follows:

$$F_T\{p_{hol}(ut, y, z_H; t)\} = \frac{1}{2u}\left\{\sum_{i=1}^{I}\hat{P}_{hol}\left(\frac{2\pi(f_i - f)}{u}, y, z_H; f_i\right) + \sum_{i=1}^{I}\hat{P}_{hol}^*\left(\frac{2\pi(f_i + f)}{u}, y, z_H; f_i\right)\right\}$$ [Equation 7]

in which $F_T$ represents a Fourier transform function, $P_{hol}$ represents a value of an sound pressure including a time factor in the detective coordinate system, U represents a relative velocity of the detective coordinate system to the hologram coordinate system $Z_H$ represents a Z-axis coordinate of the hologram surface in the hologram coordinate system, t represents a time, $\hat{P}_{hol}$ represents a value of sound pressure including a frequency factor by a number of waves measured in the hologram coordinate system, $\hat{P}_{hol}^*$ represents a conjugate complex number of $\hat{P}_{hol}$, f represents a frequency factor, and $f_i$ represents an individual frequency factor for each hologram.

3. An image processing system according to claim 1, wherein said detecting means comprises a cylindrical microphone array moved linearly to the sound source.

4. An image processing system according to claim 2, wherein said microphone array comprises a cylindrical microphone array moved linearly to the sound source.

5. An image processing method for estimating acoustic properties emitted from a movable sound source on a point in the sound field thereof, the sound source radiating an acoustic energy into the environmental space, in which a value of an acoustic property is estimated by a hologram of the acoustic property in a hologram surface keeping pace with the sound source, comprising:

inputting initial data to an operator, in which the initial data comprises data of initial positions of the sound source and a detecting means;

setting relative coordinate systems comprising a hologram coordinate system having the origin disposed on the initial position of the sound source and a detective coordinate system; and estimating a value of the acoustic property on a point in the sound field by carrying out a Fourier transform of data relating to said detecting means in the detective coordinate system by a time factor as follows:

$$F_T\{p_{hol}(ut, y, z_H; t)\} = \frac{1}{2u}\left\{\sum_{i=1}^{l} \hat{P}_{hol}\left(\frac{2\pi(f_i - f)}{u}, y, z_H; f_i\right) + \sum_{i=1}^{l} \hat{P}^*_{hol}\left(\frac{2\pi(f_i + f)}{u}, y, z_H; f_i\right)\right\}$$

[Equation 7]

in which $F_T$ represents a Fourier transform function, $P_{hol}$ represents a value of an acoustic property including a time factor in the detective coordinate system, U represents a relative velocity of the detective coordinate system to the hologram coordinate system, $Z_H$ represents a Z-axis coordinate of the hologram surface in the hologram coordinate system, t represents a time, $\hat{P}_{hol}$ represents a value of acoustic property including a frequency factor by a number of waves measured in the hologram coordinate system, $\hat{P}_{hol}^*$ represents a conjugate complex number of $\hat{P}_{hol}$, f represents a frequency factor, and $f_i$ represents an individual frequency factor for each hologram.

6. An image processing method according to claim 5, for estimating sound pressure emitted from a movable sound source on a point in the sound field thereof, wherein said detecting means includes a microphone array, in which the initial data inputted in said inputting step comprise data of the initial position of the sound source detected by photoelectric sensors and data of an initial position of the microphone array;

the setting step and the estimating step are carried out by a personal computer, and in order to estimate a value of the sound pressure on a point in the sound field, carrying out Fourier transform of data relating to said microphone array in the detective coordinate system by a time factor as follows:

$$F_T\{p_{hol}(ut, y, z_H; t)\} = \frac{1}{2u}\left\{\sum_{i=1}^{l} \hat{P}_{hol}\left(\frac{2\pi(f_i - f)}{u}, y, z_H; f_i\right) + \sum_{i=1}^{l} \hat{P}^*_{hol}\left(\frac{2\pi(f_i + f)}{u}, y, z_H; f_i\right)\right\}$$

[Equation 7]

in which $F_T$ represents a Fourier transform function, $P_{hol}$ represents a value of an sound pressure including a time factor in the detective coordinate system, U represents a relative velocity of the detective coordinate system to the hologram coordinate system, $Z_H$ represents a Z-axis coordinate of the hologram surface in the hologram coordinate system, t represents a time, $\hat{P}_{hol}$ represents a value of sound pressure including a frequency factor by a number of waves measured in the hologram coordinate system, $\hat{P}_{hol}^*$ represents a conjugate complex number of $\hat{P}_{hol}$, f represents a frequency factor, and $f_i$ represents an individual frequency factor for each hologram.

7. An image processing method according to claim 5, wherein said detecting means includes a cylindrical microphone array moved linearly to the sound source.

8. An image processing method according to claim 6, wherein said microphone array is a cylindrical microphone array moved linearly to the sound source.

\* \* \* \* \*